United States Patent [19]

Eid et al.

[11] Patent Number: 5,332,530
[45] Date of Patent: Jul. 26, 1994

[54] SOLID GEL ELECTROLYTIC MATERIAL FOR MODULATING LIGHT

[75] Inventors: Bernard A. G. Eid, Champagne/Seine; Pascal J. J. Marque, Fontainebleau, both of France

[73] Assignee: Corning Incorporated, Corning, N.Y.

[21] Appl. No.: 937,168

[22] Filed: Aug. 31, 1992

[30] Foreign Application Priority Data

Nov. 29, 1991 [FR] France ............... 91 14778

[51] Int. Cl.⁵ ............... G02F 1/00; G02F 1/15
[52] U.S. Cl. ............... 252/583; 359/265; 359/270; 359/275; 359/322; 429/188; 252/586
[58] Field of Search ............... 252/583, 586; 359/265, 359/270, 275, 322; 429/188

[56] References Cited

U.S. PATENT DOCUMENTS

| | | | |
|---|---|---|---|
| 3,245,313 | 4/1966 | Zarcomb | 359/322 |
| 4,519,930 | 5/1985 | Kakiuchi | 359/265 |
| 4,810,067 | 3/1989 | Demiryont | 359/265 |
| 4,844,592 | 7/1989 | Demiryont | 359/265 |
| 4,993,810 | 2/1991 | Demiryont | 359/265 |
| 5,056,899 | 10/1991 | Warszawski | 359/265 |
| 5,074,648 | 12/1991 | Warszawski | 359/265 |
| 5,210,638 | 5/1993 | Eide et al. | 359/265 |

FOREIGN PATENT DOCUMENTS

| | | |
|---|---|---|
| 0300915 | 1/1989 | European Pat. Off. . |
| 0392694 | 10/1990 | European Pat. Off. . |
| 2593321 | 7/1987 | France . |

*Primary Examiner*—Philip Tucker
*Attorney, Agent, or Firm*—C. S. Janes, Jr.

[57] ABSTRACT

This invention concerns an electrolytic material in the form of a solid gel for the modulation of light comprising a homogeneous mixture of:

(A) at least one organic solvent;
(B) at least one salt of an electrodepositable metal;
(C) at least one organic acid; and
(D) at least one salt of a non-electrodepositable metal that facilitates the solubilization of metal salt (B);

characterized in that it comprises in addition:

(E) at least one agent gelling said mixture to a non-flowing, transparent, solid gel state.

19 Claims, No Drawings

SOLID GEL ELECTROLYTIC MATERIAL FOR MODULATING LIGHT

BACKGROUND OF THE INVENTION

The present invention has for an objective an electrolytic material in the form of a solid gel for the modulation of light, in particular for the variable reflection of light and for the variable transmission of light. It also concerns electrooptical devices that use thin material, in particular very large devices such as windows and display cases of buildings, and windshields, windows, and roofs of automobiles. Self-evidently, it also concerns smaller devices such as screens, shutters, variably reflecting mirrors, display devices, and others that use the aforesaid material.

More precisely, the invention concerns an electrolytic material for the modulation of light of the type assuring the light modulation effect by the reversible electro-deposition of a metallic layer on the surface of a transparent electrode from metallic ions contained in the material. Such materials are also called electrochromic materials.

Devices for the modulation of light are already known consisting of two substrates of glass coated with a transparent, electrically conducting layer having a base of tin oxide or a mixture of indium oxide and tin oxide constituting two transparent electrodes between which is interposed a thin layer of electrochromic material, the assembly then constituting an electrolytic cell.

Polarization of a transparent cell of the type described above at low voltage causes the development of an absorbing and/or reflecting metal layer which is deposited on the negative electrode (cathode) by the reduction of metal ions present in the electrolytic medium. Simultaneously, an electrochemical oxidation reaction is produced by the positive electrode (anode). These two reactions must be electrochemically or chemically reversible in order to permit the return of the cell to the state of maximum transmission, either by imposing a voltage that is the reverse of the darkening voltage or by short circuiting the two electrodes, or finally, by a spontaneous return to the clear state in an open circuit. For certain applications such as, for example, windows and variably reflecting mirrors, it is desirable to maintain the cell in a given state of transmission and/or reflection lasting for a variable period reaching up to several hours before reestablishing the state of maximum transmission.

Examples of devices of the above type utilized for display signs of small surface area and primarily using silver as the metal constituting the optically active layer are specifically described in French patents or French patent applications No. 2,260,167 of Dec. 23, 1974 [U.S. Pat. No. 4,013,343 (Jaccard et al.)], No. 2,352,361 of May 19, 1976 [U.S. Pat. No. 4,153,345 (Duchene et al.)], No. 2,468,179 of Oct. 17, 1979 [U.S. Pat. No. 4,361,386 (Meyer)], No. 2,618,571 of Jul. 24, 1987 [U.S. Pat. No. 5,056,899 and U.S. Pat. No. 5,074,648 (Warszawski)], and U.S. Pat. No. 3,245,313 (Zaromb) of Apr. 12, 1966 and U.S. Pat. No. 3,626,410 (deKoster) of Dec. 7, 1971. The prior art devices utilize aqueous electrolytic media. The addition of a strong mineral acid is necessary in such devices in order to prevent hydrolysis of the metal salts that enter into the composition. The media formed in this manner exhibit low pH values and have the drawback of generating hydrogen gas concurrently with electrodeposition of the metal layer and/or of causing the degradation of transparent, electrically conductive material. In addition, organic electrolytic materials have also been proposed in certain prior art devices, especially those based upon methyl alcohol (French Patent No. 2,352,361) or a mixture of methyl alcohol and acetonitrile (French Patent No. 2,468,179) which demonstrate the drawback of mediocre stability which limits the range of their application because of the low boiling temperatures of proposed solvents.

Electrochromic materials free from these drawbacks would therefore be welcomed.

Moreover, consideration relating to safety and to the mechanical effects of hydrostatic pressure on the sealing properties demanded of very large devices that use electro-chromic materials make it desirable to form a deposit of an electrochromic material based upon the reversible electro-deposition of a metal layer present in solid form.

GENERAL DESCRIPTION OF THE INVENTION

Consequently, the present invention aims to prepare electrolytic materials in the form of solid gels having applications, among others, in devices for the modulation of light of very large and simple structure.

More precisely, the invention concerns a electrolytic material in the form of a solid gel for the modulation of light comprising a homogeneous mixture of:

(A) at least one organic solvent;
(B) at least one salt of an electrodepositable metal;
(C) at least one organic acid; and
(D) at least one salt of a non-electrodepositable metal that facilitates the solubilization of metal salt (B);

characterized in that it comprises in addition:

(E) at least one agent to gelify the mixture to a non-flowing, transparent, solid state.

The invention also concerns an electrooptic device comprising a cathode of a transparent material and an anode spaced therefrom which are coated on their interior facing sides with an electrically conducting layer, the space between the anode and the cathode being filled with an electrolytic material in accordance with the invention.

Preferably, the anode is also comprised of a transparent material. Preferably, the transparent material constituting the anode and the cathode is of glass. The organic solvent or mixture of organic solvents (A) used in the invention is chosen so as to be stable over the operating temperature range intended for the device that uses the material of the invention, both from the thermal point of view (no decomposition or boiling) and the electrochemical point of view, that is to say, with respect to the electrochemical reactions that occur during the darkening/clearing process. Another very important selection criterion is the ability of solvent (A) to form a solid gel with ingredient (E). In a non-limiting manner, it is possible to use, for example, propylene carbonate, gamma-butyrolactone, ethylene glycol, oligomers and polymers of ethylene glycol, as well as the corresponding aliphatic ethers and esters, glycerol, etc.

As constituent (B) of electrolytic material, one uses a metal salt or salts of several metals chosen from cathodically depositable metal salts belonging to the group consisting of zinc, cadmium, lead, silver, copper, iron, nickel, tin, indium, platinum, palladium, gold, bismuth, antimony, tellurium, manganese, thallium, selenium, gallium, arsenic, mercury, chromium, tungsten, and molybdenum.

At the present time the preferred metals are bismuth and copper. It is also preferable to use a combination of a copper (I) salt and a salt of another electrodepositable metal to the extent that the copper (I) salt is capable of playing the role of an auxiliary redox couple. Indeed, besides the fact that it can lead to the electrodeposition of a layer of metallic copper on the cathode, the Cu (I) can participate simultaneously in the anodic reaction:

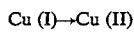

The anion of salt (B) is not critical and can be, for example, a halogen, nitrate, sulfate, perchlorate, etc. It is preferable, however, to use as salt (B) a chloride, bromide, or iodide to the extent that a halide can play the role of an auxiliary redox couple, that is to say, it exhibits the property of being reversibly oxidizable at the anode of a device according to the invention during the darkening of the latter.

The presence of at least one organic acid (C) in the electrolytic material according to the invention has been found necessary. Indeed, the absorption and/or reflection properties of the metal deposits, as well as the reversibility and homogeneity of the electrooptic effect of such, are considerably improved when the electrolytic material contains one or several acids chosen from carboxylic acids such as aliphatic monoacids, for example, formic acid, acetic acid, propionic acid, etc., polyacids, and polyfunctional acids, for example, lactic acid and levulinic acid. Acetic acid, propionic acid, levulinic acid, and mixtures thereon are preferred at this date.

Because the solvents (A) and acids (C) mentioned above, as well as their mixtures, are mediocre solvents for salts (B), it has been found necessary to incorporate in the electrolytic material at least one auxiliary salt (D) to facilitate the dissolution of salt (B). As salt (D) one can use any salt of a non-electrodepositable metal whose anion exerts a "complexing" effect on the metal of salt (B). Halides comprise anions suitable for auxiliary salt (D), such as chlorides, bromides, and iodides which exhibit the additional advantage of serving, at the same time, as an auxiliary redox couple, as indicated above with regard to salts (B). The metal of salt (D) can be an alkali metal, as Na, K, and Li, or an alkaline earth metal as Ca, Mg, Sr, or Ba. It is most particularly preferred to use a salt of lithium as salt (D) and, most especially, lithium bromide.

The proportions of constituents (A) through (D) of the electrolytic material can vary broadly and are in a large part a function of the specific constituents used, particularly of solvent (A) and of acid (C) used. As a non-limiting indication, the proportions of solvent (A) can range from 10-60% by weight, that of acid (C) can range from 30-80% by weight, that of salt (B) can range from 0.01% by weight to the limit of saturation, and that of salt (D) can range from 0.01% by weight to the limit of saturation, with respect to the total weight of constituents (A) through (D).

Constituent (E) can be a polymer or mixture of polymers with thickening properties soluble in the mixture of solvent (A) and organic acid (C) and which forms a solid polymer gel with them. Examples of suitable polymers include methyl polymethacrylate, polyvinylbutyral, polyvinylidene fluoride, polyvinylalcohol, etc. Preparation of the gel is usually effected by heating the mixture of ingredients to a temperature higher than ambient temperature, but lower than the boiling point of the mixture of (A) and (C). It is particularly preferred to use polymers which form a gel upon cooling via a transition between a viscous state and a viscoelastic state. The polyvinylidene fluoride, when combined with the mixture of gamma-butyrolacetone/acetic acid or propionic acid, exhibits this property. The resulting gel is essentially transparent and can contain a combined proportion of solvent (A) and/or organic acid (C) representing 90% by weight or more of the total material. Mixtures of polyvinylidene fluoride and methyl polymethacrylate or polyvinylbutyral have likewise been shown to be suitable in association with mixtures of propylene carbonate/propionic acid.

The transparency, adhesiveness, and toughness of the gel can be regulated by adjusting the proportions of the ingredients forming the gel.

As an indication, the proportion of the gelling polymer(s) can range from 5 to 30% by weight with respect to the total weight of the mixture of ingredients (A) through (E). The exact proportions of gelling polymer to be used strongly depends upon the molecular weight of said polymer.

Constituent (E) can also be chosen from transition metal alkoxides, for example, titanium or aluminum alkoxide, when a polyhydroxyl compound is used as solvent (A). With such alkoxides the gelling of the electrochromic material proceeds through a condensation reaction with the polyhydroxyl solvent. Specific examples of alkoxides usable in association with polyhydroxyl solvents, such as ethylene glycol and glycerol, are titanium n-butylate and aluminum di(s-butylate).

As an indication, the proportions of alcoholate can range from 15 to 60% by weight with respect to the total weight of the mixture of ingredients (A) to (E).

The solid gel electrolytic materials obtained are porous and have a high ionic conductivity which renders them capable of assuring the transport of the ions of electrodepositable metal up to their interface with the cathode.

DESCRIPTION OF PREFERRED EMBODIMENTS

The invention will now be illustrated through the following non-limiting examples.

EXAMPLE 1

One begins by preparing a mixture of gamma-butyrolactone and acetic acid (1:1 by weight). To 10 grams of this mixture are added, with considerable stirring, 1.5 grams polyvinylidene fluoride (abbreviated PVDF). The mixture obtained is heated until dissolution of the polymer and a viscous solution are obtained. Thereafter, 0.1 gram CuBr and 0.4 gram LiBr are incorporated into the latter, after which the whole mixture is heated to 100° C. with stirring, until a viscous transparent solution is obtained. One deposits between two plates of glass, each measuring 15×15 cm and coated with tin oxide, a conductor of electricity, an appropriate quantity of this hot viscous solution in order to form, after assembly and pressing of the plates together, an electrochromic device consisting of one layer of about 0.8 mm thickness of electrolytic material interposed between the two layers of glass. The assembled cell obtained is allowed to cool to ambient temperature, the viscous solution being converted to a gel during cooling.

When a direct current of 2 volts is applied to the electrodes, a layer of metallic copper appears on the cathode. The optical transmission of the device decreases from 60% to 5%. Short circuiting the electrodes restores the initial optical transmission of the device.

EXAMPLE 2

The method of operation of Example 1 is repeated except that the composition is as follows:

| (A) propylene carbonate | 40% by weight |
|---|---|
| (C) propionic acid | 40% by weight |
| (E) PVDF | 5% by weight |
| (E) PPMA (polymethylmethacrylate) | 10% by weight |
| (D) LiBr | 4% by weight |
| (B) CuBr | 1% by weight |

Here again, the viscous solution is converted to a solid gel during cooling.

When a direct current of 2 volts is applied to the electrodes of the electrochromic device obtained, a layer of metallic copper is deposited on the cathode. One can vary the optical transmission of the device from 60% to less than 1%. At low values of transmission the deposit of copper is reflecting. Short circuiting of the electrodes restores the initial transmission of the device.

EXAMPLE 3

An electrochromic composition is prepared from the following ingredients in the indicated proportions:

| (A) glycerol | 7.1% by weight |
|---|---|
| (A) butyrolactone | 14.2% by weight |
| (B) BiBr$_3$ | 1.0% by weight |
| (B) CuBr | 1.0% by weight |
| (C) acetic acid | 15.8% by weight |
| (D) LiBr | 3.2% by weight |
| (E) titanium n-butylate | 57.7% by weight |

The titanium n-butylate is added to a mixture of the other ingredients, the resulting viscous composition is then applied between two plates of glass coated with tin oxide, as described in Example 1. The viscous composition solidifies to a transparent gel with the space of 24 hours.

When a direct current of 2 volts is applied to the electrodes, the optical transmission of the device decreases from 60% to less than 10%. Short circuiting of the electrodes restores the initial optical transmission of the device.

We claim:

1. An electrolytic material in the form of a solid gel for the modulation of light comprising a homogeneous mixture of:
   (A) at least one organic solvent;
   (B) at least one salt of an electrodepositable metal;
   (C) at least one organic acid; and
   (D) at least one salt of a non-electrodepositable metal that facilitates the solubilization of metal salt (B); characterized in that it comprises in addition:
   (E) at least one agent gelling said mixture to a non-flowing, transparent, solid gel state.

2. An electrolytic material according to claim 1 characterized in that constituent (E) is comprised of at least one polymer with thickening properties.

3. A electrolytic material according to claim 2 characterized in that the polymer with thickening properties is chosen from the group of methyl polymethacrylate, polyvinylbutyral, polyvinylidene fluoride, and mixtures thereof.

4. An electrolytic material according to claim 1 comprising an organic solvent (A) which is a polyhydroxyl compound characterized in that the constituent (E) is an alcoholate of a transition metal.

5. An electrolytic material according to claim 4 characterized in that the alcoholate is titanium n-butylate or aluminum di(s-butylate).

6. An electrolytic material according to claim 1 characterized in that the salt of metal (B) is chosen from the group consisting of zinc, cadmium, lead, silver, copper, iron, nickel, tin, indium, platinum, palladium, gold, bismuth, antimony, tellurium, manganese, thallium, selenium, gallium, arsenic, mercury, chromium, tungsten, and molybdenum.

7. An electrolytic material according to claim 6 characterized in that salt (B) is selected from the group consisting of a salt of bismuth, a salt of copper (I), and a mixture of both.

8. An electrolytic material according to claim 6 characterized in that salt (B) is at least one halide selected from the group consisting of chloride, bromide, and iodide.

9. An electrolytic material according to claim 7 characterized in that salt (B) is at least one halide selected from the group of chloride, bromide, and iodide.

10. An electrolytic material according to claim 1 characterized in that acid (C) is selected from the group consisting of acetic acid, propionic acid, levulinic acid, and mixtures thereof.

11. An electrolytic material according to claim 1 characterized in that salt (D) is a salt of an alkali metal or an alkaline earth metal whose anion complexes with the electrodepositable metal.

12. An electrolytic material according to claim 11 characterized in that salt (D) is at least one halide selected from the group of chloride, bromide, and iodide.

13. An electrolytic material according to claim 12 characterized in that salt (D) is lithium bromide.

14. An electrolytic material according to claim 1 characterized in that it contains ingredients (A) through (D) in the following proportions in weight percent with respect to the total weight of ingredients (A) through (D):
   (A)=10–60%
   (B)=0.01% to the saturation limit
   (c)=30–80%
   (D)=0.01% to the saturation limit.

15. An electrolytic material according to claim 2 characterized in that it contains 5–30% by weight, with respect to the total of the mixture of ingredients (A) through (E), of polymer (E).

16. An electrolytic material according to claim 3 characterized in that it contains 5–30% by weight, with respect to the total of the mixture of ingredients (A) through (E), of polymer (E).

17. An electrolytic material according to claim 4 characterized in that it contains 15–60% by weight, with respect to the total of the mixture of ingredients (A) through (E), of alcoholate (E).

18. An electrolytic material according to claim 5 characterized in that it contains 15–60% by weight, with respect to the total of the mixture of ingredients (A) through (E), of alcoholate (E).

19. An electrooptic device comprising a cathode of a transparent material and an anode spaced therefrom which are coated on their interior facing sides with an electrically conducting layer, the space between the anode and the cathode being filled with an electrolytic material in the state of a solid gel such as defined in claim 1.

* * * * *